United States Patent
Busi et al.

(10) Patent No.: US 10,478,934 B2
(45) Date of Patent: Nov. 19, 2019

(54) INSTRUMENTED TOOL POST, AND ASSOCIATED TOOL HOLDER

(71) Applicant: CENTRE TECHNIQUE DES INDUSTRIES MECANIQUES ET DU DECOLLETAGE, Cluses (FR)

(72) Inventors: Roger Busi, Saint Laurent (FR); Patrice Laurent, Viuz en Sallaz (FR); Cyril Jayr, Saint Sixt (FR)

(73) Assignee: CENTRE TECHNIQUE DES INDUSTRIES MECHANIQUES ET DU DECOLLETAGE, Cluses (FR)

( * ) Notice: Subject to any disclaimer, the term of this patent is extended or adjusted under 35 U.S.C. 154(b) by 397 days.

(21) Appl. No.: 15/530,263

(22) PCT Filed: Jun. 16, 2015

(86) PCT No.: PCT/EP2015/063395
§ 371 (c)(1),
(2) Date: May 9, 2017

(87) PCT Pub. No.: WO2015/193266
PCT Pub. Date: Dec. 23, 2015

(65) Prior Publication Data
US 2017/0252884 A1   Sep. 7, 2017

(30) Foreign Application Priority Data
Jun. 16, 2014 (FR) ..................... 14 55471

(51) Int. Cl.
*B23Q 17/09* (2006.01)
*B23B 29/04* (2006.01)
*H04B 1/034* (2006.01)

(52) U.S. Cl.
CPC .......... *B23Q 17/0952* (2013.01); *B23B 29/04* (2013.01); *B23Q 17/0966* (2013.01);
(Continued)

(58) Field of Classification Search
CPC ............ B23Q 17/0952; B23Q 17/0966; B23Q 17/0971; B23Q 17/0985; B23B 29/12;
(Continued)

(56) References Cited

U.S. PATENT DOCUMENTS

| | | | | |
|---|---|---|---|---|
| 5,201,008 A | * | 4/1993 | Arndt | .................. H04R 25/602 381/322 |
| 2005/0112456 A1 | * | 5/2005 | Kozu | .................. H01M 2/1061 429/62 |

FOREIGN PATENT DOCUMENTS

| | | |
|---|---|---|
| FR | 2 922 130 A1 | 4/2009 |
| JP | 63-268315 | 11/1988 |

OTHER PUBLICATIONS

International Search Report dated Mar. 14, 2016, in PCT/EP2015/063395 filed Jun. 16, 2015.

* cited by examiner

*Primary Examiner* — Alan Snyder
(74) *Attorney, Agent, or Firm* — Oblon, McClelland, Maier & Neustadt, L.L.P.

(57) ABSTRACT

A tool post of a machine tool, in which the tool post is capable of receiving a cutting insert for machining a component, is provided. The tool post includes at least one sensor capable of determining a parameter representative of a cutting action between a component to be machined and a cutting insert; and a support housing which is electrically connected to the sensor and includes a battery and a printed circuit board supplied with current by the battery. The printed circuit board supports, at least partially, a radio transmission unit. The housing includes a base and a cover which can be detached from one another. The battery is supported by the cover and the printed circuit board by the base or vice versa.

10 Claims, 4 Drawing Sheets

(52) U.S. Cl.
CPC ..... *B23Q 17/0971* (2013.01); *B23Q 17/0985* (2013.01); *H04B 1/034* (2013.01); *B23B 2260/128* (2013.01); *B23B 2260/1285* (2013.01); *B23B 2270/32* (2013.01); *B23B 2270/48* (2013.01); *B23B 2270/483* (2013.01)

(58) Field of Classification Search
CPC .............. B23B 29/04; B23B 2260/128; B23B 2260/1285; B23B 2270/32; B23B 2270/48; B23B 2270/483
See application file for complete search history.

INSTRUMENTED TOOL POST, AND ASSOCIATED TOOL HOLDER

BACKGROUND OF THE INVENTION

Field of the Invention

The present invention relates to an instrumented tool post such as an insert holder or a tool holder, intended to be mounted in a machine tool and suitable for receiving a cutting insert for the machining of a workpiece.

Description of the Related Art

The increase in productivity, the machining quality constraints linked, for example, to the surface finish of the machined workpieces, and the development of the materials of the workpieces to be machined, require the constant development of the machining methods. To meet the new required criteria for performance, machining methods for optimizing the cutting conditions have been developed. Thus, the industrial concept "tool/material pair" (couple outil-matière (COM)) defined by the French standard NFE 66-520 for the selection of the cutting input parameters such as the feed, the cutting depth, the width of cut or the cutting speed of the tools in the material to be machined is known. This standard recommends that the machining conditions are specific to a tool/machined material pair, to the lubricant used, and that a study of the development of cutting output parameters, such as the vibrations, the temperature of the tools, the shape of the chips, the cutting forces or the power consumed by the spindle of the machine tool, allows the determination of an optimal usage field in terms of ranges of feeds and cutting speeds of the tools in the material to be machined. This document is therefore more specifically interested in the instrumentation of the machine tools for monitoring the cutting output parameters, via the measurement of parameters representing a cutting action.

Tools instrumented with sensors for measuring, during machining, parameters representing a cutting action are already known from the document FR 2922131 or FR 2922129 in the name of the Applicant.

However, when the tools are mounted in the tool holders, they are not always easy to instrument and implement due to the electrical connections of the sensor, and particularly with regard to the replacement of a faulty sensor, especially if the tool holders are mounted in a rotatable turret or a spindle.

To overcome this disadvantage, the Applicant has proposed, in the document FR2922130, a tool holder fitted with wireless transmission means in order to operate without cables running along the machine tool.

In this case, it is necessary to provide a case containing, for example, an independent power supply in the form of a battery which is, for example, rechargeable, a printed circuit with various components particularly for the processing or preprocessing of signals coming from one or more sensors and for the wireless transmission of the data to an associated receiver.

Such a case is generally installed on the machine tool and subjected to many environmental stresses, particularly dusts, oil and vibrations.

Moreover, it had been proposed to install the battery on the printed circuit board for greater compactness.

However, if the battery has, on the printed circuit board, a certain play in the housing thereof, due to the vibrations to which it is subjected, the electrical connections will become impaired and failures can occur.

Furthermore, given that the battery mass is large with respect to the printed circuit board mass, the repeated vibrations place the printed circuit board mechanically under strain which can lead to the breakage of some elements and/or connection tracks and to significant bending. This is, therefore, a source of potential failures in the long-term that should be avoided.

BRIEF SUMMARY OF THE INVENTION

In order to at least partially overcome the aforementioned disadvantages, the aim of the invention is to propose a tool post with an improved processing and power supply case.

To this end, the object of the invention is a tool post of a machine tool suitable for receiving a cutting insert for the machining of a workpiece, characterized in that it includes, firstly, at least one sensor suitable for determining a parameter representing a cutting action between a workpiece to be machined and a cutting insert and, secondly, a service case electrically connected to the sensor and including a battery and a printed circuit supplied with current by said battery, said printed circuit bearing, at least in part, a radio transmission unit and the case being formed from a bottom and from a cover which can be separated, and in that the battery is borne by the cover and the printed circuit by the bottom, or vice versa.

The battery is therefore distanced from the printed circuit such as to mechanically isolate the battery from the printed circuit so that there are no mechanical interactions between these two elements due to the vibrations to which the case is subjected. The service case is, thus, more robust and better suited to the environmental conditions to which it is exposed, in particular in terms of vibrations.

The tool post according to the invention can furthermore have one or more of the following aspects, taken individually or in combination.

The tool post can further include a joint inserted between the cover and the bottom.

According to one aspect, the battery is held against the internal face of the cover by a fixing element.

This fixing element comprises, for example, a bar fixed against the internal face of the cover and sandwiching the battery between the cover and the bar.

According to another aspect, the tool post includes an elastic material inserted between the fixing element and the battery, firstly, and between the battery and the internal face of the cover, secondly.

The elastic material is, for example, a foam or a silicone compound.

According to yet another aspect, blocks are arranged on the bottom of the case, on which the printed circuit board is mounted.

The tool post is, for example, formed by an insert holder intended to be mounted in a tool holder of a machine tool and suitable for receiving the cutting insert.

Another object of the invention is a tool holder intended to be mounted on a machine tool, characterized in that it includes a tool post as previously described, the tool post including a cutting insert.

BRIEF DESCRIPTION OF THE SEVERAL VIEWS OF THE DRAWINGS

Other advantages and features will emerge upon reading the description of the invention, and the appended drawings wherein.

In the figures, the identical elements are identified by the same references.

DETAILED DESCRIPTION OF THE INVENTION

Figure 1:
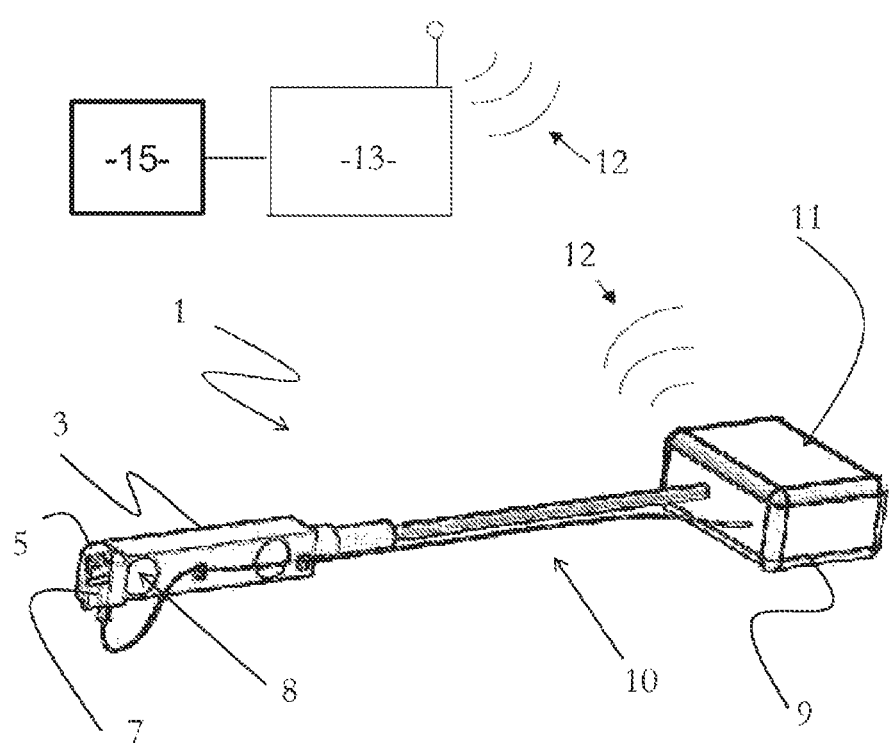
FIG. 1 shows a perspective schematic view of a tool holder according to the invention, which is intended to be mounted on a machine tool (not shown), such as a screw machine or a machining center.

FIG. 1 illustrates a tool holder 1 intended to be mounted on a machine tool (not shown), such as a screw machine or a machining center.

The tool holder 1 includes an interchangeable insert holder 3, which is suitable for receiving a cutting insert 5 for the machining of a workpiece.

The insert holder 3 allows the cutting insert 5 to be easily changed when it is worn out or unsuitable without having to change the tool holder assembly 1 in full.

The cutting insert 5, having in this example a rhombic shape, is preferably made from sintered material (carbide or ceramics).

The insert 5 is borne and held fixed relative to the corresponding insert holder 3 via conventional removable mounting.

The insert holder 3 or the tool holder 1 is referred to as the tool post.

It is therefore understood that the tool post is formed by an insert holder 3 intended to be mounted in a tool holder of a machine tool and suitable for receiving the cutting insert 5.

The tool post 3 further includes one or more sensors 7 suitable for determining one or more parameters representing a cutting action between a workpiece to be machined and a cutting insert 5.

An example of sensors 7 can be, for example, a strain gauge, a vibratory measuring sensor, a temperature sensor, an accelerometer, etc.

These sensors can be affixed against the tool post 3 or then be incorporated in a housing 8 provided, to this end, inside the tool post 3, close to the cutting insert 5.

The sensor or sensors 7 are electrically connected by cables 10 to a service case 9 which is intended to be fixed on the machine tool (not shown), for example on a turret.

The service case 9 contains a radio transmission unit 11 configured to communicate via radio waves 12 with a transceiver 13 arranged remotely from the machine tool and connected to a remote processing unit 15, for example a computer, for utilizing the parameters measured by the sensors 7.

Reference is now made to FIGS. 2-5 showing the service case 9 in detail.

The service case 9 includes a preferably rechargeable battery 17 and a printed circuit 19 supplied with current by said battery 17 (the electrical connection, for example via electric cables between the battery 17 and the printed circuit 19, is not shown in the figures).

The printed circuit 19 bears various electric and electronic components such as, for example, a unit 20 for processing or preprocessing the signals coming from the sensors 7, for example, with processors, at least in part the radio transmission unit 11 with, for example, a transmitting and receiving antenna 11A.

Figure 3:
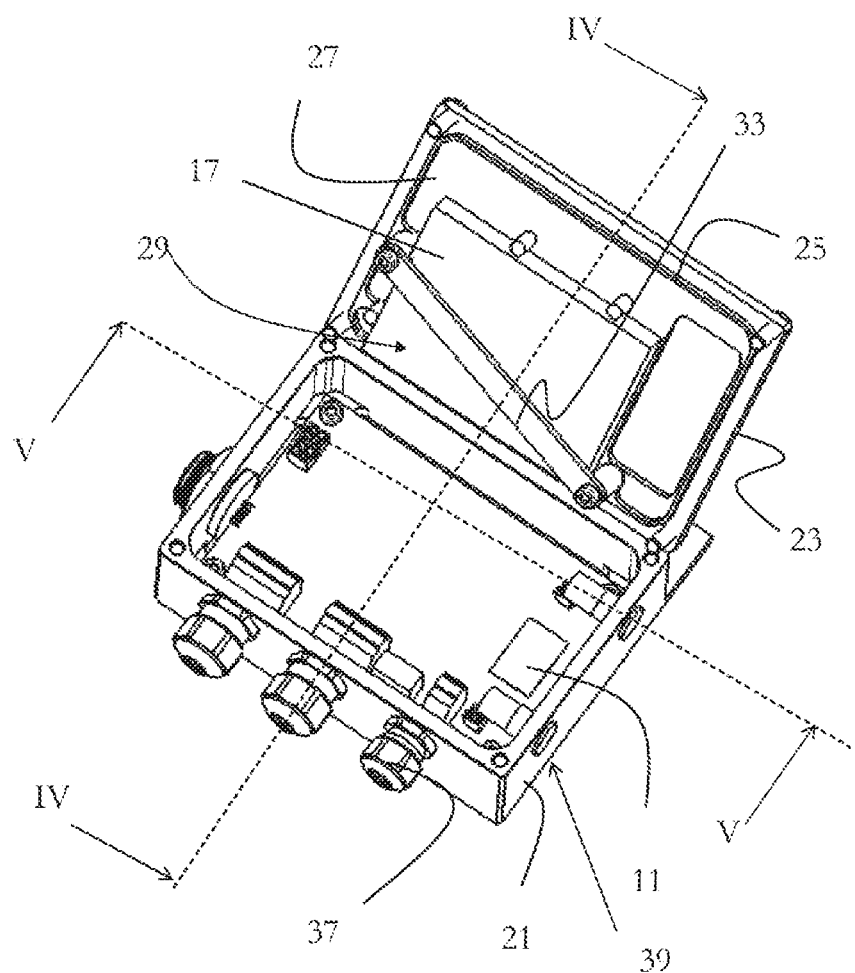
FIG. 3 shows the case of FIG. 2 in the open state.

As can be seen in FIG. 3, the case 9 is formed from a bottom 21 and from a cover 23 that can be separated from one another.

The battery 17 is borne by the cover 23 and the printed circuit by the bottom 21.

Thus, the battery 17 is distanced from the printed circuit 19 such as to mechanically isolate the battery 17 from the printed circuit 19 so that there are no mechanical interactions between these two elements due to the vibrations to which the case 9 is subjected.

Of course, according to an alternative that is not shown, it is possible for the battery 17 to be borne by the bottom 21 and the printed circuit by the cover 23 without departing from the scope of the present invention.

This mechanical isolation between the battery 17 and the printed circuit 19 is reinforced by a sealing joint inserted 25 between the cover 23 and the bottom 21. This sealing joint has both the function of preventing the entry of any liquid such as oil, or dusts, but also forms a damping element between the cover 23 and the bottom 21.

Figure 4:
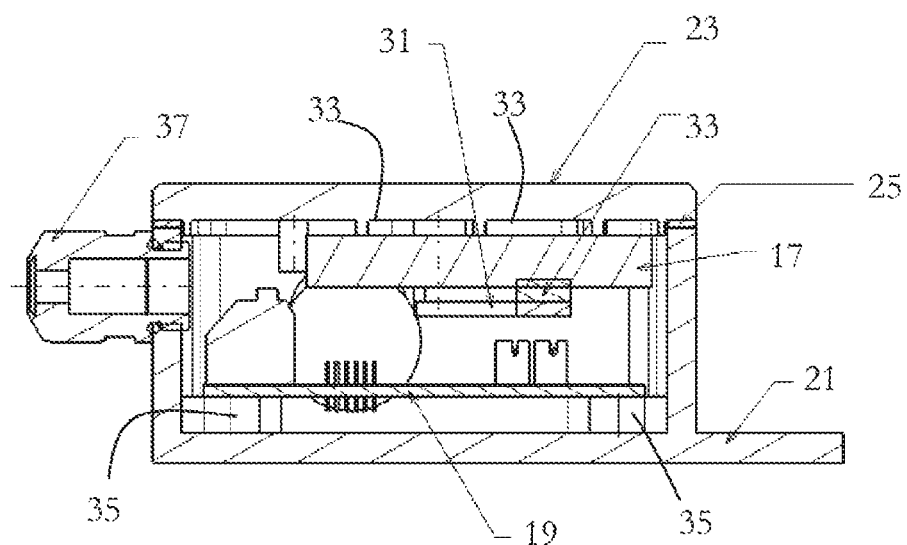
FIG. 4 shows the case of FIGS. 2 and 3 according to a cross-section view IV-IV in the closed state.
Figure 5:
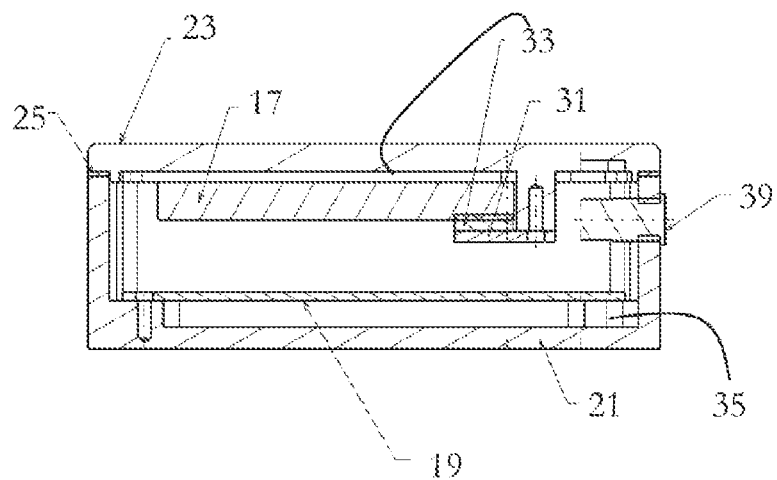
FIG. 5 shows the case of FIGS. 2 and 3 according to a longitudinal section view V-V in the closed state.

As can be seen clearly in FIGS. 4-6, the battery 17 is held against the internal face 27 of the cover 23 by a fixing element 29 such as, for example, a bar 31 fixed by screwing against the internal face 27 of the cover 23 and sandwiching the battery 17 between the cover 23 and the bar 31.

To further weaken the vibrations at the battery 17, an elastic material 33 is inserted between the fixing element 29 and the battery 17, firstly, and between the battery 17 and the internal face 27 of the cover 23, secondly.

The elastic material 33 is, for example, a foam or a silicone compound in the form of a strip stuck firstly on the internal face 27 of the cover 23 and secondly on the fixing bar 31.

Figure 2:
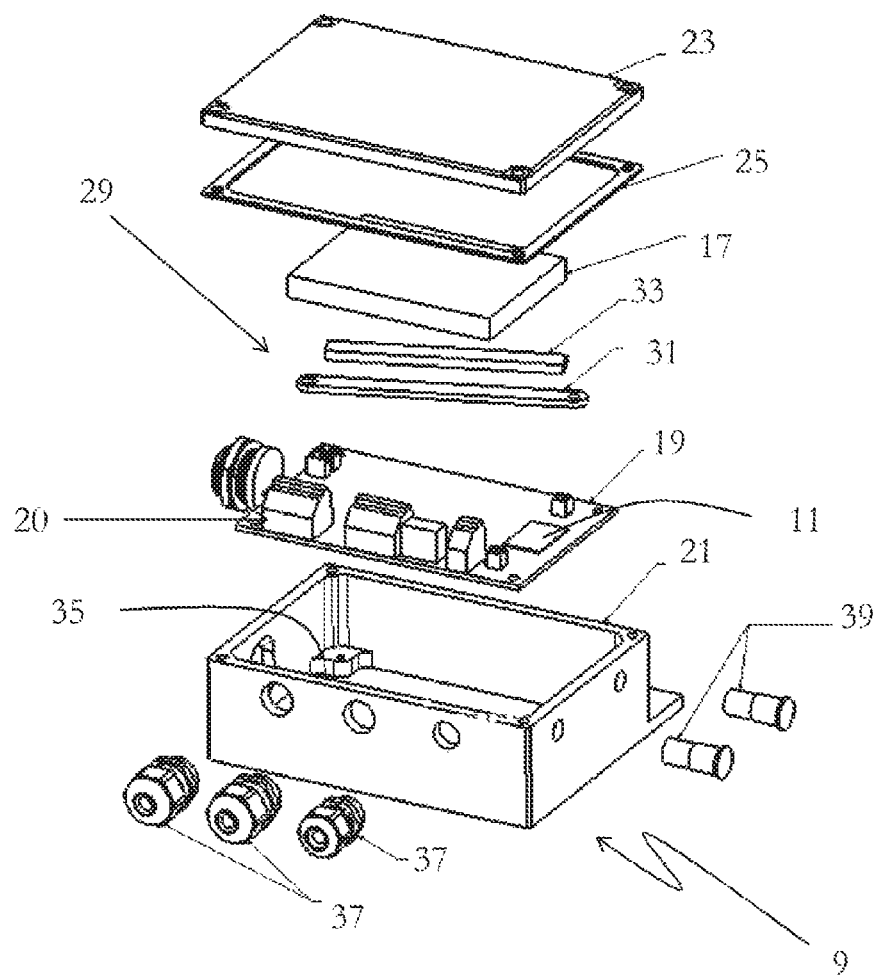
FIG. 2 shows an exploded perspective schematic view of a service case.

As can be seen in FIGS. 2, 4 and 5, the bottom 21 has, in each corner, a block 35 allowing precise positioning of the printed circuit board while holding it at a distance from the bottom.

Moreover, glands 37 allow the sealed passage of the cables coming from the sensors 9 inside the case.

Visual indicators 39 connected to the printed circuit board 19 allow the operating state of the case 9 to be indicated to an operator.

It is therefore understood that the battery 17 and the printed circuit 19 are mechanically separated such as to prevent any harmful interaction due to the vibrations, which lengthens the reliability of the printed circuit 19 and the life of the battery 17.

The invention claimed is:

1. A tool post of a machine tool suitable for receiving a cutting insert for machining of a workpiece, comprising:
    at least one sensor which determines a parameter representing a cutting action between a workpiece to be machined and a cutting insert; and
    a service case electrically connected to the sensor and including a battery and a printed circuit supplied with current by said battery, said printed circuit bearing, at least in part, a radio transmission unit and the case being formed from a bottom and from a cover which can be separated,
    wherein the battery is borne by the cover and the printed circuit by the bottom, or vice versa, and wherein the tool post further comprises a sealing joint inserted between the cover and the bottom to reinforce mechanical isolation between the battery and the printed circuit board.

2. The tool post as claimed in claim 1, wherein the battery is held against an internal face of the cover by a fixing element.

3. The tool post as claimed in claim 2, wherein the fixing element comprises a bar fixed against the internal face of the cover and sandwiching the battery between the cover and the bar.

4. The tool post as claimed in claim 2, further comprising an elastic material inserted between the fixing element and the battery, and inserted between the battery and the internal face of the cover.

5. The tool post as claimed in claim 4, wherein the elastic material is a foam or a silicone compound.

6. The tool post as claimed in claim 1, further comprising blocks arranged on the bottom of the case and on which the printed circuit board is mounted.

7. The tool post as claimed in claim 1, wherein the tool post is formed by an insert holder intended to be mounted in a tool holder of a machine tool and suitable for receiving the cutting insert.

8. A tool holder intended to be mounted on a machine tool, comprising a tool post as claimed in claim 7, the tool post including a cutting insert.

9. The tool post as claimed in claim 1, wherein the battery is distanced from the printed circuit such that the battery and the printed circuit are free of mechanical interactions between each other when the case vibrates.

10. The tool post as claimed in claim 1, wherein the sealing joint presents a planar shape.

* * * * *